March 23, 1965

C. L. HARVEY 3,174,521

SELF-LOCKING SCREW

Filed Jan. 9, 1961

INVENTOR.
CARL L. HARVEY
BY Hudson Boughton,
Williams, David & Hoffmann
ATTORNEYS

United States Patent Office 3,174,521
Patented Mar. 23, 1965

3,174,521
SELF-LOCKING SCREW
Carl L. Harvey, Kent, Ohio, assignor to The Lamson & Sessions Company, Cleveland, Ohio, a corporation of Ohio
Filed Jan. 9, 1961, Ser. No. 81,435
1 Claim. (Cl. 151—14)

This invention relates to self-locking screws and the like and, as one of its objects, aims to provide a novel lock screw of a simple and practical construction capable of being produced in a rapid and economical manner, and which does not require the use therewith of any separate part such as would require an assembling operation or which might become dislodged or be subject to deterioration.

Another object is to provide a novel self-locking screw or the like whose locking means comprises a bulged portion on the threaded stem at the location of a transverse opening therein so that the sides of the bulged portion have a limited flexibility and an expansive action for gripping the wall of a threaded opening when the stem is screwed thereinto.

A further object is to provide a novel lock screw construction of the general character above referred to in which the threaded stem having the transverse opening carries a conventional screw thread of a given nominal thread size and which, on the bulged portion of the stem, has a transverse dimension larger than the normal diameter of such nominal thread size so that the locking means becomes effective merely by screwing the threaded stem into a mating threaded opening.

Other objects, novel characteristics and advantages of this invention will be apparent in the following detailed description and in the accompanying drawing forming a part of this specification and in which, FIG. 1 is a side elevation of a self-locking screw of the novel construction provided by this invention;

Figure 1:
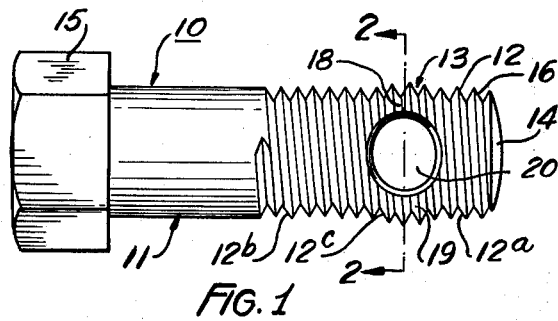
Figure 2:
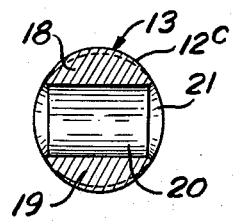
FIG. 2 is a transverse section taken through the screw at the location of the locking means, as indicated by section line 2—2 of FIG. 1.

As a practical embodiment of the self-locking screw of this invention, FIGS. 1 and 2 of the drawing show such a screw 10 having a stem 11 which includes a threaded portion 12, and locking means 13 located on such threaded stem portion. The screw 10 is here shown as being of the machine screw type with the threaded portion 12 extending to the free end 14 of the stem 11 and with the locking means 13 located at an intermediate point of the length of the threaded stem portion. The locking means 13 can be provided on the threaded stem of various other screws and like members. The stem 11 is provided at its upper end with an integrally formed head 15, in this case, a head of a conventional hexagonal shape.

The threaded stem portion 12 carries a screw thread 16 of a conventional form and of a nominal thread size or diameter suitable for the stem 11 and for the particular use to which the screw 10 is to be put. The threaded portion 12 comprises first and second threaded stem portions 12$^a$ and 12$^b$ located on axially opposite sides of the locking means 13, and a third threaded stem portion 12$^c$ connecting the first and second threaded portions and having the locking means 13 thereon.

The thread 16 extends in a continuous helical relation along and around the stem portions 12$^a$, 12$^c$ and 12$^b$, and the portions of the thread which are carried by the first and second stem portions 12$^a$ and 12$^b$ are of a diameter which is of a normal size or dimension for the nominal thread size represented by the screw thread 16. The portion of the thread 16 which is carried by the stem portion 12$^c$ is initially also of a normal diameter but, as is further explained hereinafter, the locking means 13 is formed by imparting a bulged shape or condition to the threaded stem portion 12$^c$ so that, when the threaded portion 12 is advanced into an internally threaded opening, the locking means will exert an expansive gripping action therein for producing a self-locking effect for the screw 10.

The locking means 13 can be further described as comprising outwardly deflected longitudinally extending stem portions 18 and 19 lying on opposite sides of an opening 20 and which connect the threaded stem portions 12$^a$ and 12$^b$. The connecting portions 18 and 19 lie on opposite sides of the opening 20 in a direction transversely of the stem 11 and have thread convolutions of the continuous helical screw thread 16 thereon but, since these connecting portions have been deflected outwardly from the opening 20 incident to the formation of the bulged condition of the stem portion 12$^c$, the thread convolutions thereon have been distorted by an enlargement of the diameter thereof sufficiently to produce the self-locking action.

The opening 20 preferably extends entirely through the threaded stem portion 12 and will usually be formed in the stem 11 prior to the formation of the screw thread 16 thereon. The opening 20 can be formed in any suitable manner, such as by drilling, and is here shown as having chamfers 21 extending therearound at opposite ends thereof. The chamfers 21 can be omitted if desired. The opening 20 provides a void space in the threaded stem portion 12 which remains permanently open or unfilled.

After the stem 11 has been provided with the opening 20 and the screw thread 16 has been formed on the pierced stem so as to extend in a continuous relation around and along the first, second and third threaded portions 12$^a$, 12$^b$ and 12$^c$, the portion of the stem containing the opening 20 is then expanded in a suitable manner by deflecting the connecting portions 18 and 19 outwardly to produce the bulged condition of the third threaded portion 12$^c$ and the thread convolutions carried thereby to comprise the locking means 13.

The connecting portions 18 and 19 are flexible stem portions capable of being sprung inwardly toward the opening 20 when the threaded stem 12 is screwed into an internally threaded opening having a corresponding mating screw thread therein. When the connecting portions 18 and 19 are thus sprung inwardly, they will have a normal expansive tendency by which the bulged thread convolutions of the locking means 13 will be pressed against the wall of the internally threaded opening as the self-locking action of the locking means.

The flexibility of the stem portions 18 and 19 can be varied for the achievement of different locking effects by the locking means 13. This can be accomplished by varying the size and shape of the opening 20, and consequently, the thickness, shape and flexibility of the connecting portions 18 and 19. The opening 20, as initially formed in the stem 11, is a cylindrical opening but is here shown as having assumed an oval shape as the result of the outward deflection of the stem portions 18 and 19. As mentioned above the outward deflection of the stem portions 18 and 19 can be produced in any suitable manner, and two method procedures for accomplishing this deflection will be described next with reference to FIGS. 3 and 4 of the drawing.

Figure 3:
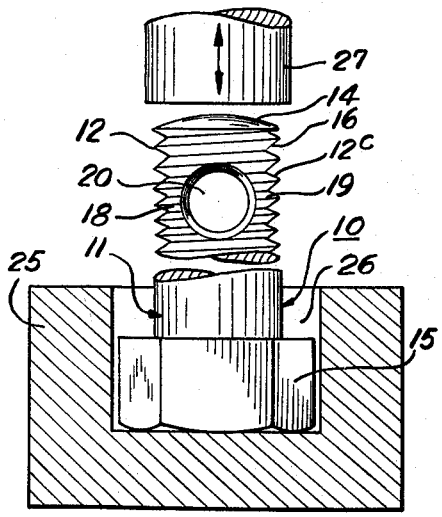
FIG. 3 is an elevational view, partly in section and somewhat diagrammatic in form, and which illustrates one way of producing the novel self-locking screw.

In FIG. 3 the outward deflection of the stem portions 18 and 19 is shown as being carried out by the first method procedure which involves the application of a compressive force of appropriate value to the screw 10 endwise thereof. For carrying out this procedure the screw 10 is disposed with one end thereof in a hollow holder means, in this case, a die member 25 having a socket recess 26 of a size to receive the hexagonal head 15. The threaded stem portion 12 projects from the die opening 26 and the expanding force is applied in an axial direction to the free end 14 by a suitable thrust member or ram 27 moving in a closing direction toward the die member 25.

The closing actuation of the thrust member 27 through a suitable distance causes a partial collapse of the opening 20, axially of the stem 11, incident to an outward deflection of the stem portions 18 and 19. The closing movement of the thrust member 27 will usually be a rapid movement so that the compressive force is applied to the screw 10 as an impact blow.

Figure 4:
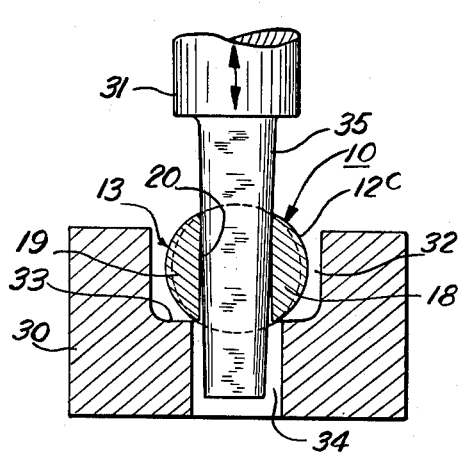
FIG. 4 is an elevational view, partly in section and somewhat diagrammatic in form, and which illustrates another way of producing the novel screw.

In FIG. 4 of the drawing the second method procedure is shown for producing the outward deflection of the stem portions 18 and 19 and which involves the use of die and punch members 30 and 31. The die 30 has a channel shaped recess 32 therein in which the stem 11 of the screw 10 is adapted to be received so as to lie on the bottom wall 33 of such recess with the opening 20 disposed above a clearance opening 34 in the die.

The punch member 31 is movable toward and away from the die 30 and carries a depending tapered expanding pin portion 35 of a size to be movable into and through the opening 20. The expanding pin 35 is thinner than the axial width of the opening 20 and is transversely curved along the two side edges thereof which engage against the stem portions 18 and 19 of the screw 10. The taper angle of the side edges of the expanding pin 35 is of a suitable value so that entry of the pin into the opening 20 will produce the desired outward deflection of the stem portions 18 and 19. In order that the outward deflection of the stem portions 18 and 19 may be accomplished in a symmetrical manner, the expanding operation can be carried out by successive insertions of the pin 35 into the opening 20 from opposite sides of the stem 11.

From the construction and characteristics of the self-locking screw 10 as above described, it will be recognized that the locking means 13 comprises a bulged intermediate portion of the thread-carrying length of the stem 11 which, upon entry into an internal threaded opening having a corresponding mating screw thread, will produce a self-locking action of the screw in such threaded opening. Since the first threaded portion 12ª remains in an undistorted condition corresponding with a normal thread diameter for the conventional screw thread 16, the screw 10 can be easily started into the threaded opening. Thereafter the bulged locking means 13 will be pulled into the threaded opening by the co-operative action of the engaged threads. It will also be seen that since the opening 20 will usually be formed in the stem 11 prior to the threading thereof, there will be no damage to the threads incident to the formation of such opening. Additionally it will be seen that the screw 10 can be hardened in the usual way after the outward deflection of the stem portions 18 and 19 to form the locking means 13 has been accomplished, if a screw of a hardened character is desired.

Figure 5:
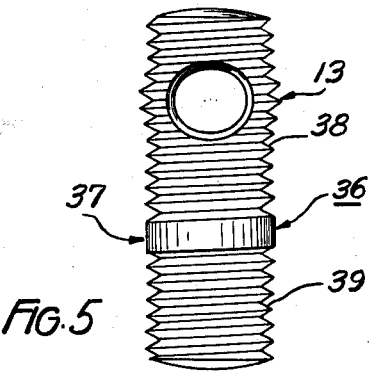
FIG. 5 is a side elevation showing another form of screw having the same locking means thereon.

FIG. 5 of the drawing shows the same locking means 13 on a conventional screw threaded stud 36. The stud 36 comprises a stem 37 having upper and lower threaded portions 38 and 39 as is customary in a threaded member of this kind. Although the locking means 13 is here shown as having been provided only on the upper threaded portion 37, it can if desired, be provided on the lower threaded portion 38 instead of, or in addition to, the locking means on the upper threaded portion.

Figure 6:
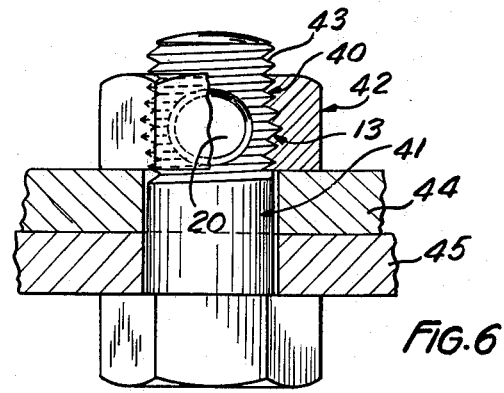
FIG. 6 is an elevational view partly in section showing a fastening combination formed by the use of a self-locking screw of the novel construction provided by this invention.

FIG. 6 of the drawing shows a threaded connection 40 formed by co-operating screw and nut members 41 and 42 and having a locked effect by reason of the same locking means 13 provided on the threaded portion 43 of the screw 41. The threaded portion 43 is engaged in the internally threaded opening of the nut 42 and produces a self-locking effect with the latter by the expansive action of the locking means 13. The screw and nut members 41 and 42 are here shown as comprising a clamping bolt for a pair of plates 44 and 45.

From the accompanying drawing and the foregoing detailed description it will now be readily understood that this invention provides a self-locking screw of a simple and practical form which can be economically produced in large quantities and with a desired uniformity, and which does not interfere with hardening of the screw in the usual manner. It will also be seen that the locking means is of a form which is not subject to deterioration, nor to the dislodgment or deterioration of any movable part or insert. Further, it will be recognized that the novel locking means comprises an integral part of the screw itself and is resilient and will therefore remain in an effective condition to produce the desired locking action for either a single application or for successive applications of the screw.

Although the self-locking screw of this invention has been illustrated and described herein to a somewhat detailed extent it will be understood, of course, that the invention is not to be regarded as being limited correspondingly in scope but includes all changes and modifications coming within the terms of the claim hereof.

Having described my invention, I claim:

A self-locking screw comprising; a stem having a free end and a transverse opening extending diametrically through the stem at a single point spaced from said free end; helical thread means extending along said stem to said free end comprising first and second threaded portions on axially opposite sides of said opening and both carrying portions of a conventional screw thread of a given nominal diameter; and locking means comprising a third threaded portion connecting said first and second threaded portions and carrying other screw thread elements; said transverse opening providing a void space in said third threaded portion and the axial length of said third threaded portion measured axially of said screw being approximately equal to the dimension of said void space extending axially of said screw, said void space being oval shaped in cross section with the major axis extending transversely of the screw axis and the dimension of the void transversely of the screw being greater than the dimension of the void axially of the screw; said third threaded portion comprising outwardly deflected longitudinally extending stem portions of limited flexibility lying on laterally opposite sides of said void space transversely of said stem and having said other screw thread elements thereon;

said third threaded portion having, in the free state thereof, a larger transverse dimension diametrically of said stem than the maximum transverse dimension of said first and second threaded portions; the flexible stem portions of said third threaded portion being subject to compressive flexure in a direction inwardly of said void space whereby said locking means has a self-expanding capability for producing a locked condition in response to screwed engagement of said third threaded portion in a mating threaded opening having an internal thread of said given nominal diameter.

References Cited in the file of this patent

UNITED STATES PATENTS

| | | |
|---|---|---|
| 278,230 | Fairlamb | May 22, 1883 |
| 550,898 | Richardson | Dec. 3, 1895 |
| 2,380,944 | Cole | Aug. 7, 1945 |
| 2,407,160 | Kahn | Sept. 3, 1946 |
| 2,414,870 | Harding | Jan. 28, 1947 |
| 2,855,609 | Moore | Oct. 14, 1958 |
| 2,856,617 | Widmann | Oct. 21, 1958 |

FOREIGN PATENTS

| | | |
|---|---|---|
| 20,191 | Austria | May 25, 1905 |